United States Patent [19]

Jackson

[11] 4,212,108
[45] Jul. 15, 1980

[54] LAYOUT TOOL FOR FRAMING STUDS

[76] Inventor: Hubert H. Jackson, 2512 21st St., Santa Monica, Calif. 90405

[21] Appl. No.: 1,675

[22] Filed: Jan. 8, 1979

[51] Int. Cl.³ .............................................. G01B 3/00
[52] U.S. Cl. .............................. 33/174 G; 33/180 R; 33/459
[58] Field of Search ................ 33/174 G, 180 R, 455, 33/458, 459, 465, 454, 194

[56] References Cited

U.S. PATENT DOCUMENTS

| | | | |
|---|---|---|---|
| 1,665,400 | 4/1928 | Bitiner | 33/194 |
| 2,090,835 | 8/1937 | Gardham | 33/455 |
| 3,169,320 | 2/1965 | Currie | 33/174 G |

*Primary Examiner*—Willis Little
*Attorney, Agent, or Firm*—Ralph B. Pastoriza

[57] ABSTRACT

The tool includes a straight elongated bar having a flat top surface to which are pivoted first and second narrow bar segments. The bar segments are arranged to swing about their pivots between closed positions in which the segments overlie the bar to open positions in which the segments run transverse to the bars at right angles. The distance between the segments is made exactly equal to the desired distance between the framing studs so that the tool can be positioned alongside a baseboard to which the framing studs are to be attached and appropriate pencil marks made using the segments as ruler edges. The tool is designed to accommodate four bar segments uniformly spaced in accord with the desired stud spacing so that four stud position markings can be effected with a single application of the tool. Also, the tool is designed for easy disassembly to permit compact storage.

5 Claims, 7 Drawing Figures

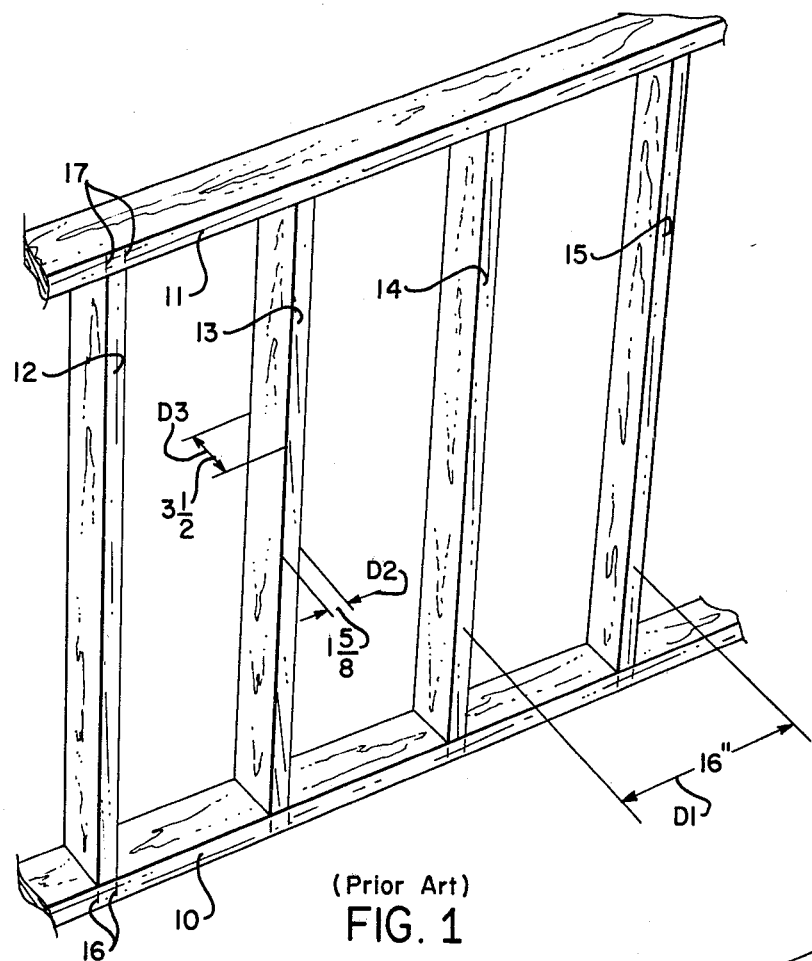
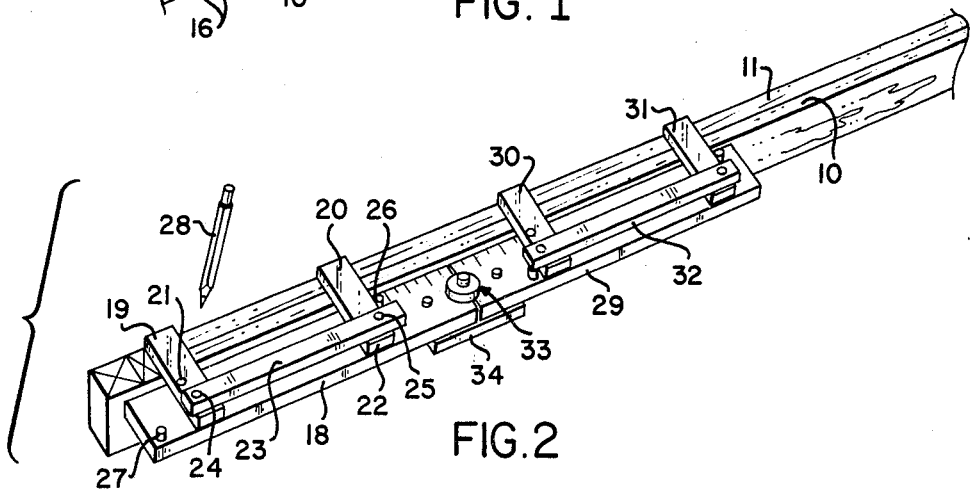
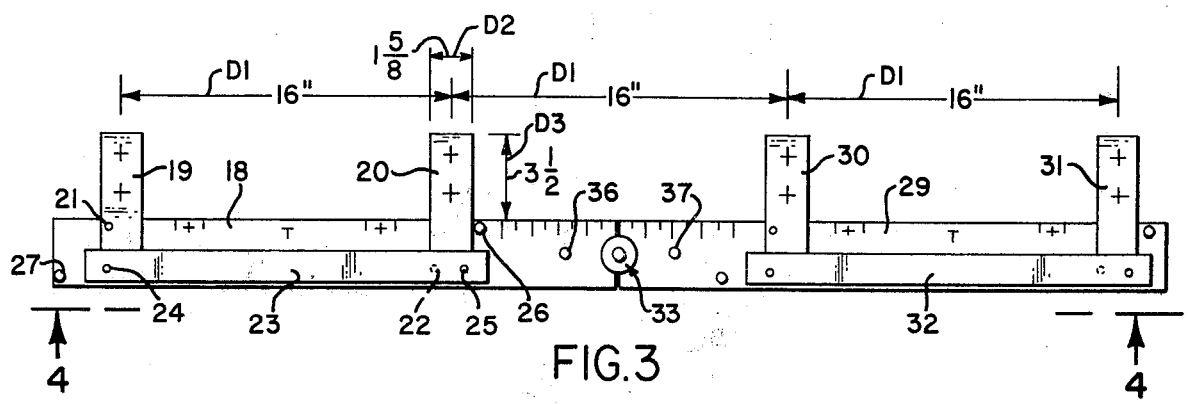

LAYOUT TOOL FOR FRAMING STUDS

This invention relates generally to tools and more particularly to a carpenter's tool to facilitate proper positioning of studs in erecting a stud framing.

BACKGROUND OF THE INVENTION

In the construction of walls for residential areas, the most commom procedure is to utilize 2×4 inch studs normally eight feet in length. These studs are vertically positioned parallel to each other in spaced relationship between a baseboard and an overhead board to define a stud framing. The baseboard itself is secured by bolts or other appropriate means to a floor such as a concrete slab.

Normal stud spacing in the foregoing types of construction is sixteen inches. It is the normal practice, accordingly, to simply use a carpenter's ruler and make pencil marks along the base and overhead boards at 16 inch intervals. These marks thus serve to locate the position of the studs.

While the foregoing operation appears simple enough, errors can result. If only a single mark is made at 16 inch intervals, in later positioning the vertical stud, the reference marks may not be consistently used. For example, the mark may be used by the carpenter to designate one side of the lower portion of the stud and as the placing of the studs continues, the mark may later on be used to designate the opposite side thereby throwing off the proper positioning by an amount equivalent to the thickness of the stud. Under such circumstances, the last stud will not correspond to the end of the proposed wall and the entire job has to be redone.

In other instances, the reference marks may be used to position the center of the stud but this positioning requires some guesswork on the part of the carpenter unless he takes the trouble to dissect the width of the stud and make a mark which can then be properly aligned with the 16 inch stud position mark.

It can be appreciated from the foregoing that not only is the proper positioning of studs for framing a time consuming operation, but errors can creep in.

BRIEF DESCRIPTION OF THE PRESENT INVENTION

Bearing the foregoing considerations in mind, the present invention contemplates the provision of a special layout tool particularly designed for framing studs all to the end that the heretofore described problems are avoided.

More particularly, the tool of the present invention comprises at least one straight elongated bar having first and second bar segments pivoted to its top surface for swinging movement in their own planes between closed positions in which the segments overlie and are parallel to the bar to open positions in which the segments extend at exactly right angles to the bar. The pivot positions are such that when the segments are in their open position, the distance between the segments precisely corresponds to the desired distance between the framing studs to be erected; for example, 16 inches. The width of the segments themselves corresponds to the width of the 2×4 studs which in actual practice is 1⅝ inches.

With the foregoing tool, the carpenter need then only swing the segments to their open positions and lay the tool along the baseboard and overhead board and then utilize the segments as ruler edges to draw double lines demarking precisely the position of the lower and upper ends of the studs.

In the preferred embodiment of this invention, two straight elongated bars are provided each carrying two swingable segments so that when the bars are secured in end-to-end relationship, there are provided four segments all precisely equally spaced. The appropriate stud positions can thus be marked off four at a time.

By utilizing the tool as described above, there is no ambiguity as to the proper positioning of the stud relative to the parallel marks. Moreover, the process is fairly rapid and avoids the necessity of fiddling with a roller tape type ruler.

BRIEF DESCRIPTION OF THE DRAWINGS

A better understanding of this invention will be had by now referring to the accompanying drawings illustrating a preferred embodiment wherein:

FIG. 1 is a fragmentary perspective view of a typical construction used in forming a wall wherein several studs are shown between a baseboard and overhead board properly positioned;

FIG. 2 is a perspective view of the layout tool for framing the studs of FIG. 1 in accord with this invention;

FIG. 3 is a top plan view of the layout tool in operative position;

DETAILED DESCRIPTION OF THE PREFERRED EMBODIMENT

Figure 4:
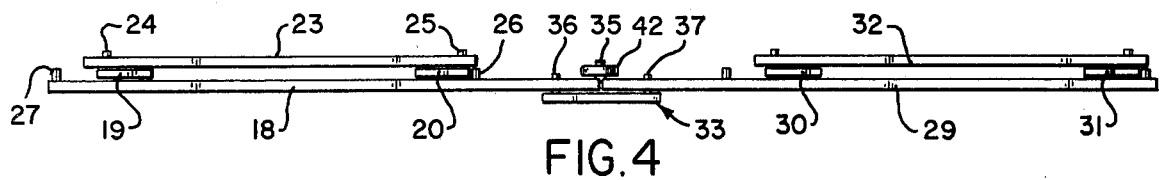
FIG. 4 is a side elevational view looking in the direction of the arrows 4—4 of FIG. 3.

Referring first to FIG. 1 there is shown some typical stud framing comprising a baseboard 10, overhead board 11 with a plurality of vertical studs 12, 13, 14 and 15 positioned therebetween. Each of the studs is identical and normally comprises typical 2×4 inch pieces of wood approximately eight feet long. As indicated in FIG. 1, the studs are uniformly spaced from each other at a distance D1 typically sixteen inches. Further, each 2×4 stud is of an actual thickness D2 of 1⅝ inches and width D3 of 3½ inches as indicated for the stud 13.

As mentioned previously, the conventional procedure for positioning the studs 12–15 is to mark off with a ruler and pencil 16 inch intervals on the baseboard 10 and overhead board 11. In accord with the present invention, rather than utilize the usual ruler and pencil for this purpose, a special layout tool for framing the studs is provided. This tool rather than forming a single mark on the baseboard 10 and overhead board 11 is designed to enable double marks such as indicated at 16 and 17 to be made, the distance between the marks corresponding to the thickness D2 of the stud. By using double marks, there is no ambiguity in the proper positioning of the lower and upper ends of the studs prior to nailing into position.

Referring now to FIG. 2, there is shown one manner in which the tool of this invention is used to mark the baseboard 10 and overhead board 11 of FIG. 1. As shown, the boards 10 and 11 are placed on their edge in side-by-side parallel relationship with their ends coextensive.

The tool itself is shown in both FIGS. 2 and 3 and includes a straight elongated bar 18 having a flat narrow top surface. First and second flat narrow bar segments 19 and 20 in turn, are pivoted to this top surface as at the pivot points 21 and 22 for swinging movement in their own planes between closed and open positions as will be clearer as the description proceeds. A connecting link 23 aids in this swinging movement and is pivoted at opposite ends to the first and second segments respectively at points 24 and 25 spaced from the pivot points 21 and 22. The pivot point 22 in the showing of FIGS. 2 and 3 is eclipsed by the connecting link 23 and is thus only indicated in phantom lines.

The elongated bar 18 further includes small upwardly projecting stops 26 and 27. When the bar segment 20 is extending at exactly right angles to the elongated bar 18 as illustrated in both FIGS. 2 and 3, its right hand edge is against the stop 26. The connecting link 23 assures that the first bar segment 19 is similarly at exactly right angles to the front edge of the elongated bar 18.

The stop 27, in turn, serves to index the segments when they are swung to their closed positions as will be subsequently described.

Considering the structure described thus far, it can be appreciated that by pivoting the segments 19 and 20 in positions such that when extended as shown the distance between these segments is exactly D1 or 16 inches, appropriate marks can be made as by a pencil 28 when the tool is positioned along the baseboard 10 and overhead board 11 as shown in FIG. 2. Thus, lines are drawn using either side of each segment as a straight edge directly onto the baseboard 10 and overhead board 11.

In the preferred embodiment of the invention as illustrated, there is provided an additional straight elongated bar 29 provided with bar segments 30 and 31 with a connecting link 32 all pivoted together and to the additional bar 29 in the same manner as described for the first and second segments 19 and 20 and connecting link 23 relative to the first mentioned elongated bar 18. The distance of the third bar segment 30 from its adjacent end of the additional elongated member 29 is such that when this one end is abutted against the end of the first mentioned elongated member 18 following the second bar segment 20 the distance between the second and third segments 20 and 30 when in open condition is exactly D1 or sixteen inches. This relationship is illustrated in FIG. 3. The elongated bar 18 and additional elongated bar 29 are held in axial end-to-end alignment by an appropriate connecting means designated generally by the arrow 33.

Utilizing the complete structure shown in FIGS. 2 and 3 four consecutive stud positions can readily be marked off with a single application of the tool there being provided in each instance double lines so that no ambiguity in placement of the studs results.

Referring to the side elevational view of FIG. 4, the position of the bar segments 19 and 20 and the connecting link 23 relative to the stops 26 and 27 is illustrated for the open position of the bar segments. Since the third and fourth bar segments associated with the additional elongated bar 29 and associated connecting link 32 are identical to the first and second bar segments 19 and 20 and connecting link 23, a detailed description of the manner in which these latter elements operate will suffice for both.

Figure 5:
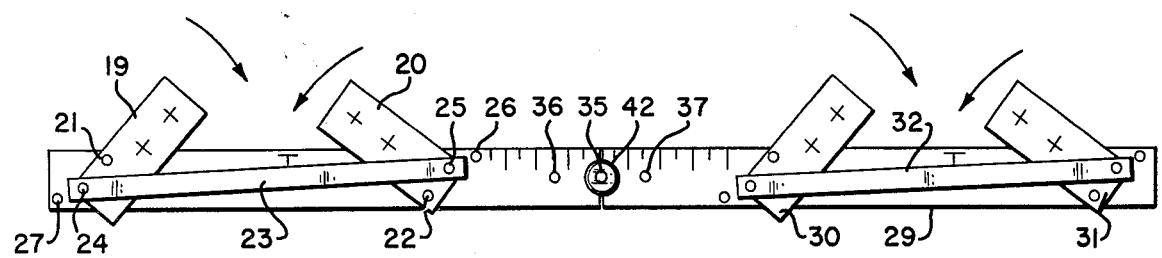
FIG. 5 is another top plan view showing the tool in partially folded condition preparatory to storage.

Referring to FIG. 5, the manner in which the bar segments 19 and 20 move to closed position is illustrated. Thus, when it is desired to fold up the tool for storage, the connecting link 23 can be moved to effect simultaneous swinging movement of the bar segments 19 and 20 about their respective pivots 21 and 22. In this respect, the pivot for the first bar segment 19 is disposed adjacent to the front edge of the elongated bar intermediate the ends of the segment 19. The pivot for the second bar segment 20, in turn, is disposed at the one end of this bar segment nearest the elongated bar 18. The folding is such that the first and second bar segments 19 and 20 swing towards each other as indicated by the arrows.

Figure 6:
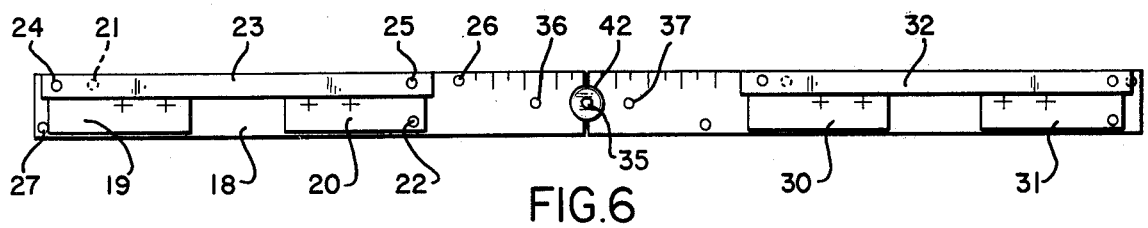
FIG. 6 is a view similar to FIG. 5 showing the tool completely folded or closed.

FIG. 6 shows in plan view the completely folded position of the bar segments wherein the upper edges thereof as viewed in FIG. 6 underlie partially the connecting link 23. It will be noted in FIG. 6 that the left end of the first bar segment 19 abuts against the stop 27 which will index the position of the first bar segment 19 to a parallel relationship with the elongated bar 18; that is, a position in which it overlies this bar. The second bar segment 20, in turn, is automatically indexed by the connecting link 23.

In FIGS. 5 and 6, the third and fourth bar segments 30 and 31 and cooperating connecting link 32 are similarly folded by manual operation of the connecting link 32.

Figure 7:
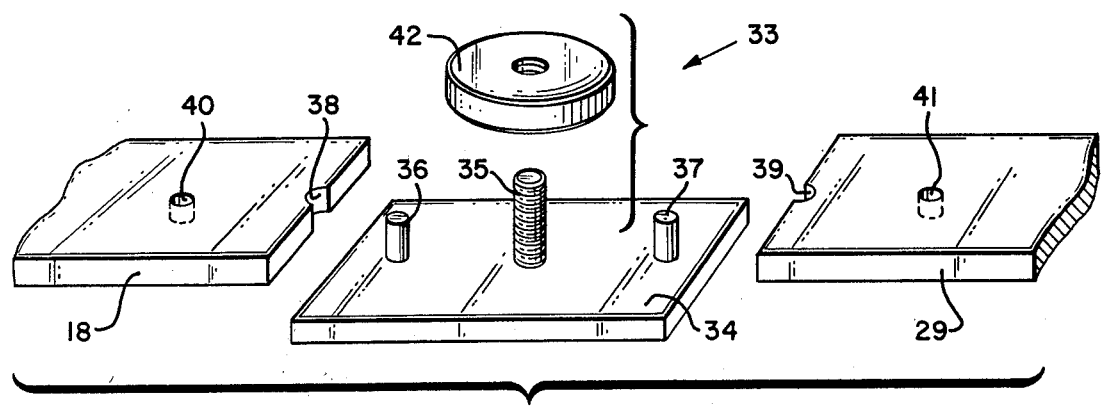
FIG. 7 is an exploded perspective view of one type of connecting means for holding sections of the tool in proper alignment and further illustrating the manner in which the tool can be disassembled for compact storage.

Referring now to FIG. 7, there is shown in considerable detail one type of connecting means 33 for securing the elongated bar 18 in axial alignment with the additional elongated bar 29 with their ends in abutting relationship.

As shown in FIG. 7, this connecting means comprises a plate 34 having a central threaded upwardly extending projection 35 and upwardly extending indexing pins 36 and 37 in spaced diametrically opposite sides of the projection 35.

The abutting ends of the elongated bars 18 and 19 in turn are provided with central semi-circular cut-outs 38 and 39 arranged to straddle opposite sides of the threaded projection 35 when these ends are in abutting relationship. Further, portions of the elongated bars adjacent to the abutting ends are provided with indexing bores 40 and 41 positioned to receive the indexing pins 36 and 37 when the ends are in the desired abutting relationship.

The securement of the connecting means 33 will be evident by referring to both FIGS. 4 and 6 which illustrate the pins received in the indexing openings.

The connecting means is completed by the provision of a threaded member 42 arranged to be received on the threaded projection 35 to sandwich the abutting ends between the member 42 and the plate 34. The indexing pins 36 and 37 received in the indexing bores 40 and 41 hold the two elongated bars in exact axial alignment.

With the foregoing type of connecting means, it is very simple to disassemble the connection by simply unthreading the member 42 from the upward threaded projection 35. The plate 34 is then moved downwardly to move the pins 36 and 37 from the openings 40 and 41 and the two elongated bars 18 and 29 can then be positioned one on top of the other with the various bar segments in their folded or closed positions to thereby provide for compact storage.

From all of the foregoing, it will thus be evident that the present invention has provided an extremely useful tool ideally suited for stud framing wherein the proper positions of up to four studs can be quickly and easily marked without ambiguity with one application of the tool.

The unique pivoting arrangement and connecting links for the various bar segments permits the tool to be easily stored and yet immediately readied for use by a single manual action on the connecting link. The indexing stops as described assure that the bar segments will be at exact right angles to the elongated bars in their open positions and precisely overlying the bars in parallel relationship thereto when in their closed positions for optimum storage.

As a practical matter, the tool would normally comprise the two elongated bar members arranged to be secured in end-to-end axial alignment as described. However, it should be understood that either one of the straight elongated bars with their associated two bar segments could be used by themselves to mark the position of two studs.

It will be further understood, of course, that after two or four stud positions have been marked off with the tool, the first bar segment is then shifted to the last marking and then further successive stud positions can be marked off. In other words, the tool is simply reapplied to effect for stud markings at a time until all of the necessary markings are complete. Since the spacing between the bar segments is fixed to correspond precisely to the desired stud spacing, there can be no errors involved in the markings.

Minor changes in the construction falling within the scope and spirit of this invention will occur to those skilled in the art. The layout tool for framing studs is accordingly not to be thought of as limited to the exact structure set forth for illustrative purposes.

I claim:

1. A layout tool for framing studs including, in combination:
   (a) a straight elongated bar having a flat narrow top surface;
   (b) first and second flat narrow bar segments pivoted to the top surface of said elongated bar adjacent to opposite ends of said flat narrow top surface for swinging movement in their own planes towards each other to closed positions in which the segments overlie and are parallel to said elongated bar, and to open positions away from each other in which the segments extend at right angles to said elongated bar, the distance between said segments when in open positions corresponding to the desired distance between framing studs to be erected;
   (c) an additional straight elongated bar having third and fourth bar segments pivoted to its top surface for swinging movement in an identical manner to said first and second bar segments, the distance between one end of said additional straight elongated bar and the third bar segment being such that when said one end is in abutting alignment with the end of said first mentioned straight elongated bar following said second segment, the distance between said second segment and third segments when in open positions corresponds to said desired distance; and
   (d) connecting means for securing the straight elongated bars in end-to-end alignment whereby, said tool can be positioned along base and overhead boards for the framing studs with the open bar segments overlying the boards and four stud positions marked on the boards with one application of said tool by utilizing said segments as a pencil guide, and whereby said segments can be folded to their closed positions and said straight elongated bar disconnected from said additional straight elongated bar for easy packing and transportation of said tool.

2. A tool according to claim 1, including connecting links pivoted at opposite ends to said first and second segments and said third and fourth segments respectively at points spaced from the pivot points of said segments to their associated elongated bars so that said segments can simultaneously be swung between said closed and opened positions by manual movement of said connecting links.

3. A tool according to claim 2, including stop projections on the top surfaces of said elongated bars for indexing said second and fourth segments in their positions to form said right angles and said first and third segments in their positions overlying said bars, said second and fourth and first and third segments being indexed to their closed and
open positions respectively by said connecting links.

4. A tool according to claim 3, in which the pivot points of said first and third segments to their elongated bars are adjacent to an inner edge of the elongated bars intermediate the ends of the first and third segments and the pivot points of said second and fourth segments to their elongated bars are adjacent to the outer edge of the elongated bars at the end portions of the second and fourth segments, the pivot points of said links being adjacent to the end portions of the segments closest to their respective elongated bars when in open positions such that the first and second segments swing in opposite directions towards each other when moving from their open to closed positions and the third and fourth segments swing in opposite directions towards each other when moving from their open to closed positions.

5. A tool according to claim 1, in which said connecting means comprises a flat plate having a central upwardly extending threaded projection and upwardly extending indexing pins in spaced relation on diametrically opposite sides of said projection, the abutting ends of the elongated bars having semi-circular cut-outs to straddle said threaded projection when said plate is disposed beneath the abutting ends, portions of the elongated bars adjacent to their abutting ends having indexing openings receiving said pins respectively; and a threaded member receivable on said threaded projection so that downward threading clamps the abutting ends of the elongated bars between the plate and member, the indexing projections in said indexing holes holding the elongated bars in axial alignment, disassembly of said connecting means and swinging of said segments to their closed positions permitting compact storage of said tool.

* * * * *